United States Patent
Jagannatha et al.

(10) Patent No.: US 11,513,829 B2
(45) Date of Patent: Nov. 29, 2022

(54) METHOD AND SYSTEM FOR INSTANT RECOVERY OF APPLICATION DATA USING VIRTUAL MACHINE BACKUPS

(71) Applicant: EMC IP Holding Company LLC, Hopkinton, MA (US)

(72) Inventors: Manjunath Jagannatha, Bangalore (IN); Sunil Yadav, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 334 days.

(21) Appl. No.: 16/528,580

(22) Filed: Jul. 31, 2019

(65) Prior Publication Data

US 2021/0034400 A1 Feb. 4, 2021

(51) Int. Cl.
*G06F 9/455* (2018.01)
*G06F 11/14* (2006.01)

(52) U.S. Cl.
CPC ...... *G06F 9/45558* (2013.01); *G06F 11/1469* (2013.01); *G06F 2009/45562* (2013.01); *G06F 2009/45583* (2013.01)

(58) Field of Classification Search
CPC ............. G06F 11/1448; G06F 11/1451; G06F 11/1469; G06F 16/188; G06F 16/196; G06F 2201/84
See application file for complete search history.

(56) References Cited

U.S. PATENT DOCUMENTS

| | | | |
|---|---|---|---|
| 8,099,572 B1* | 1/2012 | Arora | G06F 13/28 711/E12.013 |
| 9,785,647 B1* | 10/2017 | Petri | G06F 16/196 |
| 9,996,429 B1 | 6/2018 | Kumar et al. | |
| 2011/0087874 A1* | 4/2011 | Timashev | G06F 11/1446 713/100 |
| 2012/0017114 A1* | 1/2012 | Timashev | G06F 11/1451 714/15 |
| 2015/0244802 A1* | 8/2015 | Simoncelli | G06F 9/45558 709/219 |
| 2017/0199791 A1* | 7/2017 | Mitkar | G06F 9/5077 |
| 2018/0173554 A1* | 6/2018 | CaraDonna | G06F 11/07 |
| 2019/0250997 A1* | 8/2019 | Karasev | G06F 9/45558 |
| 2020/0285389 A1* | 9/2020 | Suarez | G06F 11/1448 |
| 2020/0327017 A1* | 10/2020 | Vijayan | G06F 11/1451 |

* cited by examiner

*Primary Examiner* — Lewis A Bullock, Jr.
*Assistant Examiner* — Melissa A Headly
(74) *Attorney, Agent, or Firm* — Chamberlain, Hrdlicka, White, Williams & Aughtry (57) ABSTRACT

A method for recovering data includes obtaining a recovery request for application data, identifying a backup associated with the recovery request, generating a placeholder disk associated with the backup, generating a template virtual machine associated with the placeholder disk, generating an application-based virtual disk based on the placeholder disk, generating a file extent map based on the recovery request, populating the application-based virtual disk using the backup, the placeholder disk, and the file extent map to obtain a populated application-based virtual disk, replacing the placeholder disk with the populated application-based virtual disk, and after replacing the placeholder disk with the populated application-based virtual disk, initiating a migration of the template virtual machine.

12 Claims, 8 Drawing Sheets

METHOD AND SYSTEM FOR INSTANT RECOVERY OF APPLICATION DATA USING VIRTUAL MACHINE BACKUPS

BACKGROUND

Computing devices may include any number of internal components such as processors, memory, and persistent storage. Each of the internal components of a computing device may be used to generate data and to execute functions. The generated data may be backed up. The backed up data may then need to be used to restore the computing device or application to a prior known state. The manner in which the restoration process occurs may impact the overall performance of the computing devices.

SUMMARY

In general, in one aspect, the invention relates to a method for recovering data. The method includes obtaining a recovery request for application data, identifying a backup associated with the recovery request, generating a placeholder disk associated with the backup, generating a template virtual machine associated with the placeholder disk, generating an application-based virtual disk based on the placeholder disk, generating a file extent map based on the recovery request, populating the application-based virtual disk using the backup, the placeholder disk, and the file extent map to obtain a populated application-based virtual disk, replacing the placeholder disk with the populated application-based virtual disk, and after replacing the placeholder disk with the populated application-based virtual disk, initiating a migration of the template virtual machine.

In general, in one aspect, the invention relates to a non-transitory computer readable medium, which includes computer readable program code, which when executed by a computer processor enables the computer processor to perform a method for recovering data. The method includes obtaining a recovery request for application data, identifying a backup associated with the recovery request, generating a placeholder disk associated with the backup, generating a template virtual machine associated with the placeholder disk, generating an application-based virtual disk based on the placeholder disk, generating a file extent map based on the recovery request, populating the application-based virtual disk using the backup, the placeholder disk, and the file extent map to obtain a populated application-based virtual disk, replacing the placeholder disk with the populated application-based virtual disk, and after replacing the placeholder disk with the populated application-based virtual disk, initiating a migration of the template virtual machine.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for recovering data. More specifically, embodiments of the invention relate to a method for recovering application data of a virtual machine using a backup of the virtual machine in combination with a template virtual machine.

Figure 1:
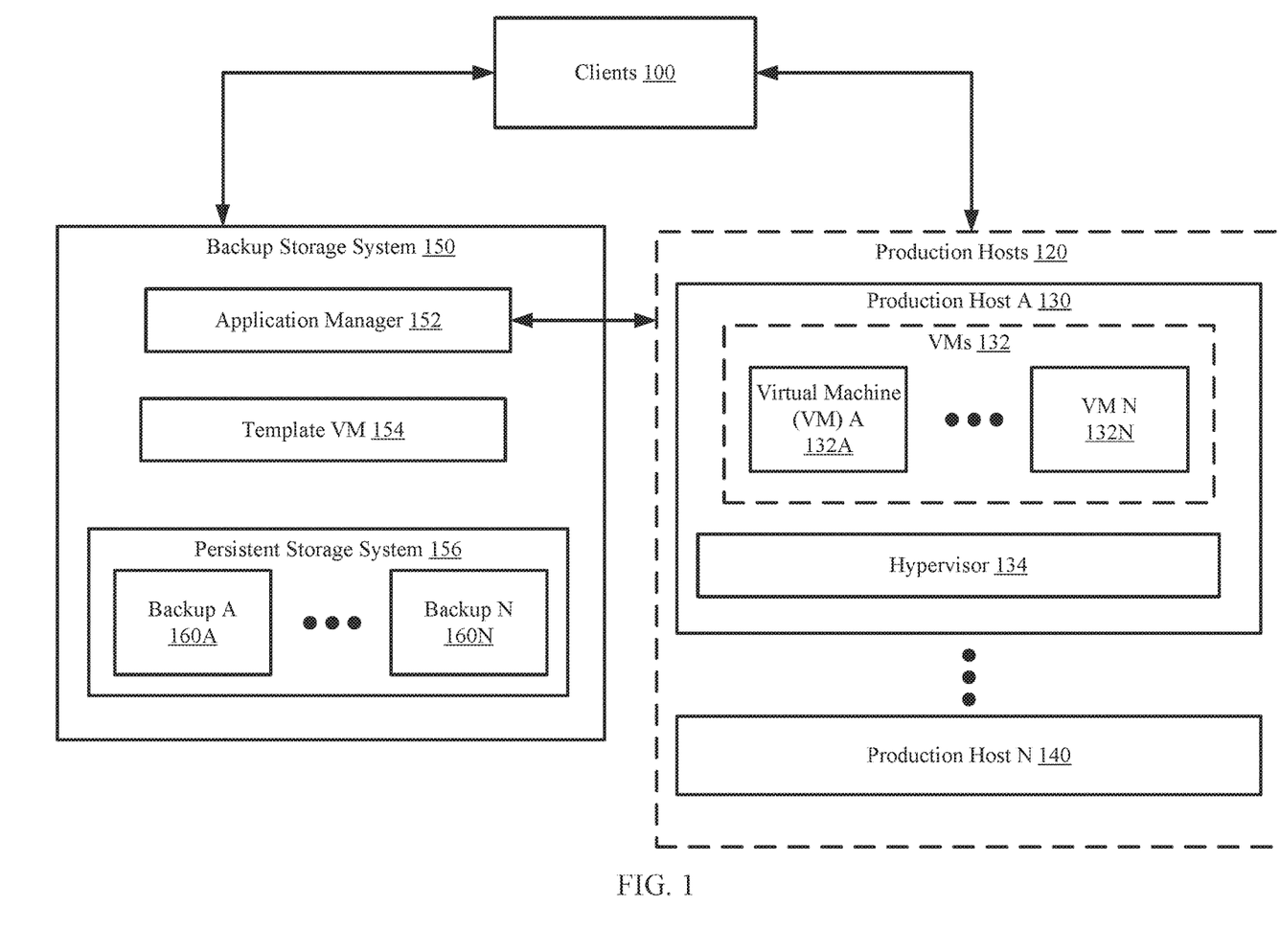
FIG. 1 shows a diagram of a system in accordance with one or more embodiments of the invention.

FIG. 1 shows a diagram of a system in accordance with one or more embodiments of the invention. The system includes a client (100), one or more production hosts (120), and a backup storage device (150). Each production host (130, 140) may include any number of virtual machines (VMs) (132) and a hypervisor (134) that manages the virtual machines. Each component may be operably connected via any combination of wired and/or wireless connections. Each component illustrated in FIG. 1 is discussed below.

In one or more embodiments of the invention, the client(s) (100) sends data to be stored in the production hosts (120). The client(s) (100) may request to modify and/or update the data stored in the production hosts (120). Additionally, the client(s) (100) may issues requests to recover data from the backup storage system (150) to be utilized in the production hosts (120).

Figure 4:
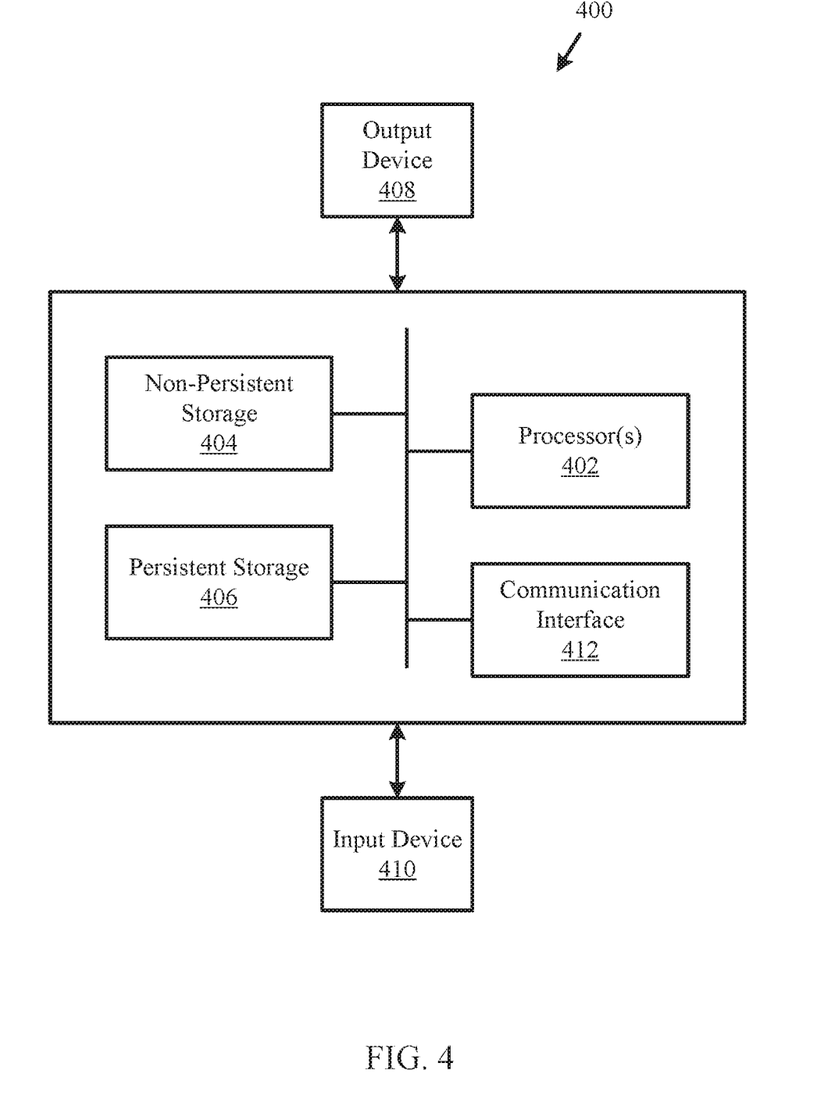
FIG. 4 shows a diagram of a computing device in accordance with one or more embodiments of the invention.

In one or more embodiments of the invention, the client(s) (100) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client(s) (100) described throughout this application.

In one or more embodiments of the invention, the client(s) (100) is implemented as a logical device. The logical device may utilize the computing resources of any number of computing devices and thereby provide the functionality of the client(s) (100) described throughout this application.

In one or more embodiments of the invention, the production hosts (120) host VMs (132). The virtual machines (132) may be logical entities executed using computing resources (not shown) of the production hosts (130, 140). Each of the virtual machines (132) may be performing similar or different processes. In one or more embodiments of the invention, the virtual machines (132) provide services to users, e.g., clients (100). For example, the virtual machines (132) may host instances of databases, email servers, and/or other applications. The virtual machines (132) may host other types of applications without departing from the invention.

In one or more embodiments of the invention, the virtual machines (132) are implemented as computer instructions, e.g., computer code, stored on a persistent storage (e.g., on a production host (130)) that when executed by a processor(s) of the production host (130) cause the production host (130) to provide the functionality of the virtual machines (132) described throughout this application.

In one or more embodiments of the invention, the production hosts (130) each include a hypervisor (144) that orchestrates the operation of the VMs (142). The hypervisor (144) may orchestrate the operation of the VMs (142) by allocating computing resources to each virtual machine (142A, 142N).

Further, the hypervisor (144) of a production host (e.g., 130) may aid in the migration of a template VM (154) to the production host (130). The hypervisor (144) may aid in the migration by assigning and/or providing a portion of the computing resources of the production host (130) to the template VM (154) and installing any programs or applications to the production host (130) that allow the template VM (154) to operate on the production host (130).

Figure 2A:
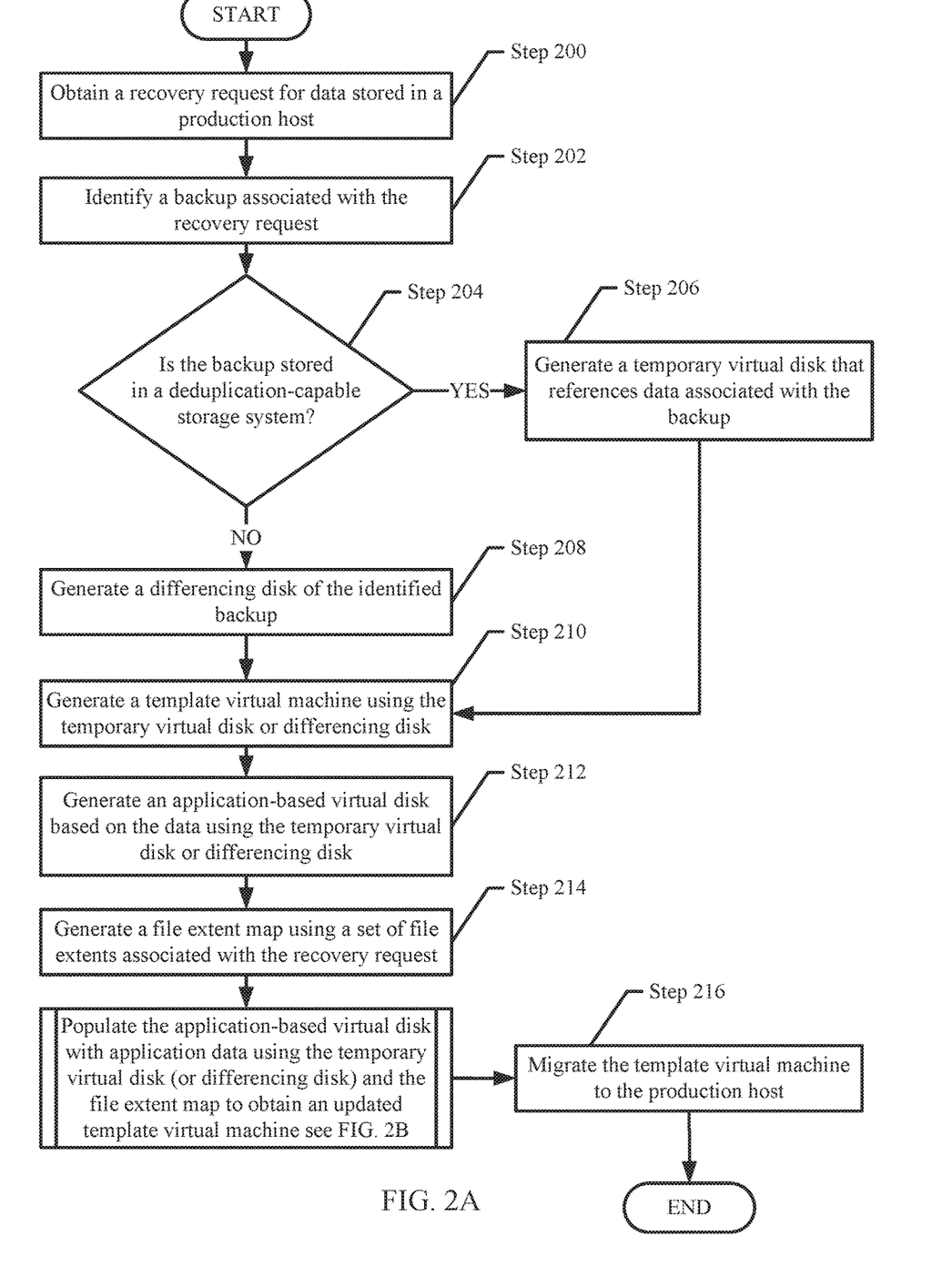
FIG. 2A shows a flowchart for performing an application-based recovery in accordance with one or more embodiments of the invention.
Figure 2B:
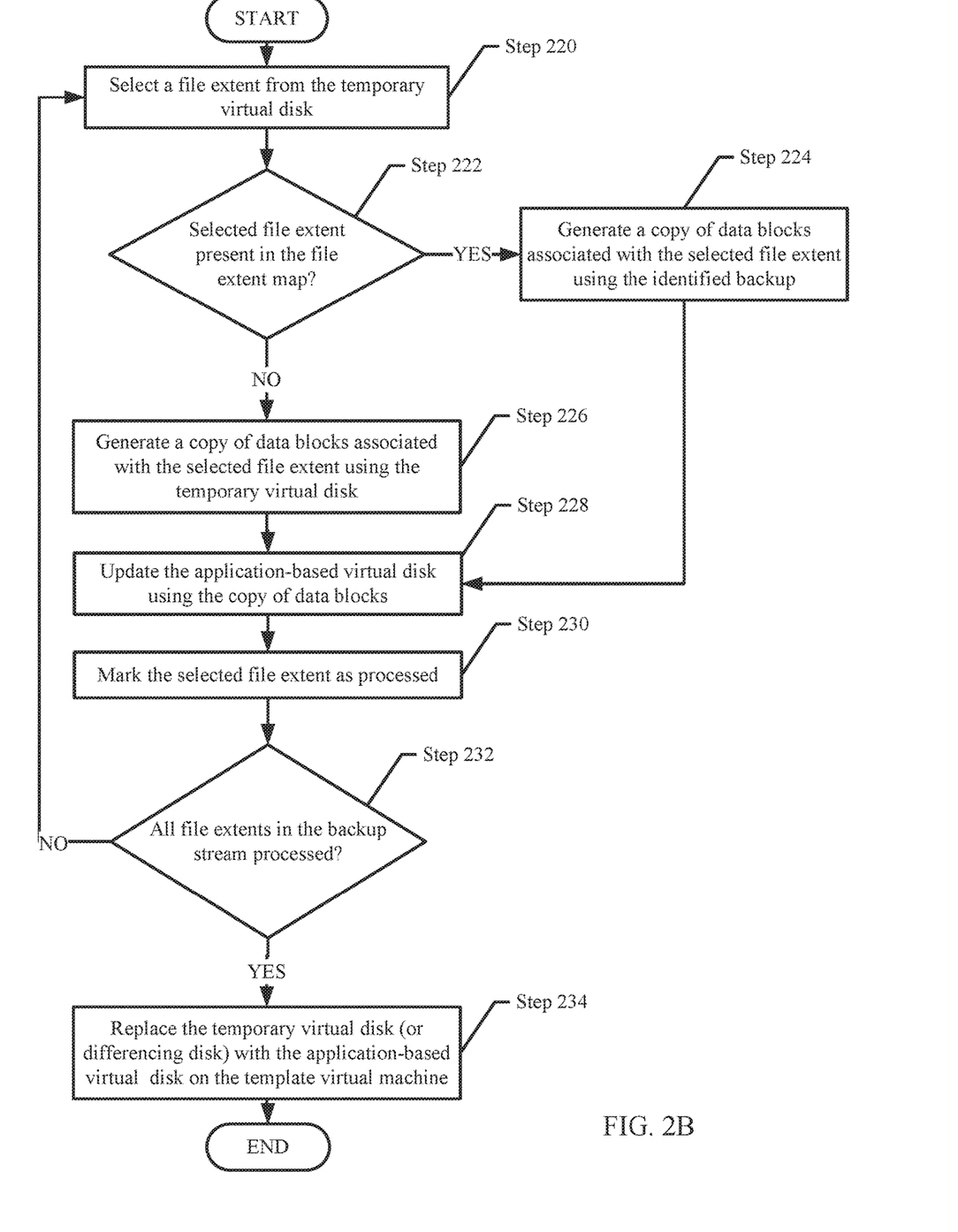
FIG. 2B shows a flowchart for populating an application-based virtual disk in accordance with one or more embodiments of the invention.
Figure 2C:
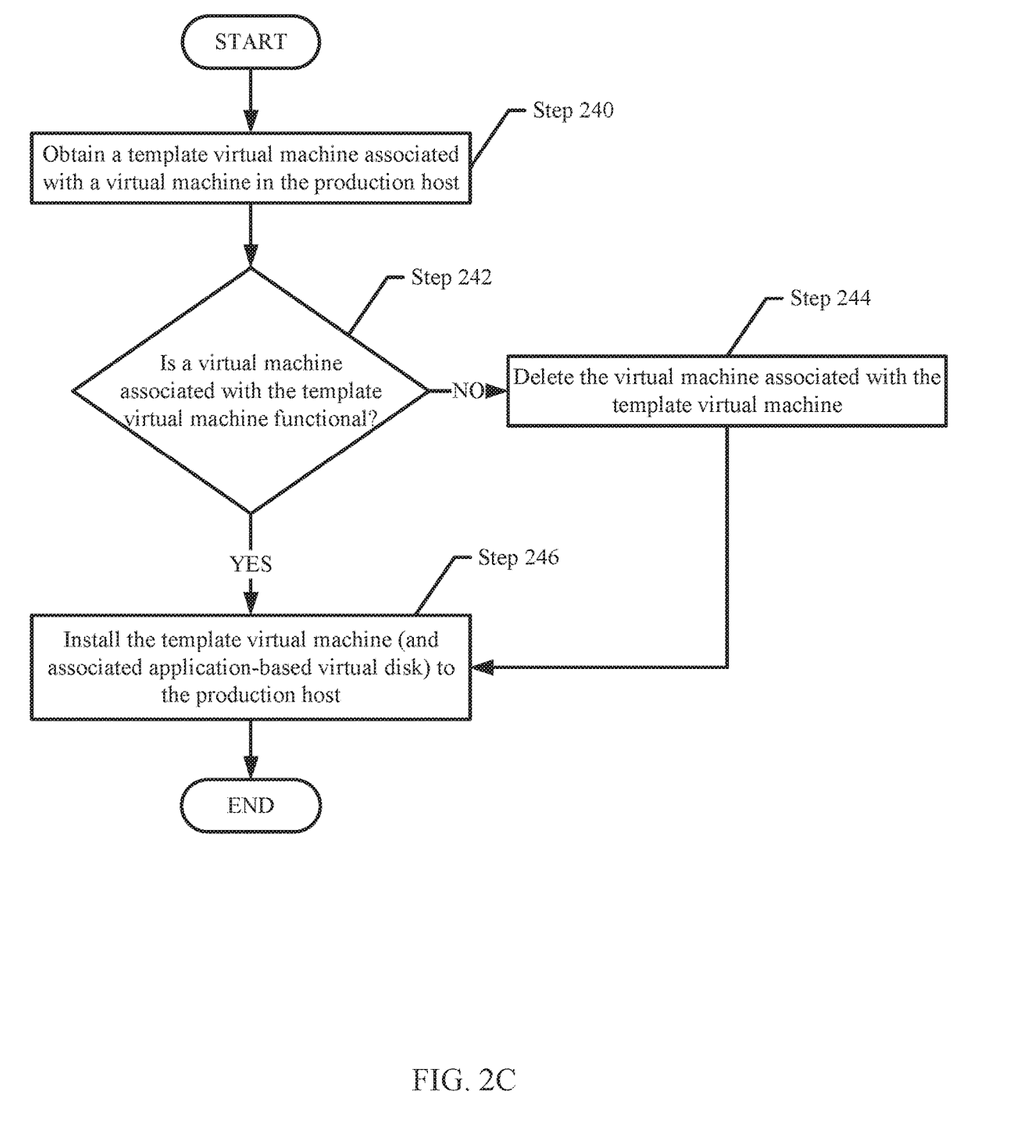
FIG. 2C shows a flowchart for installing a template virtual machine in accordance with one or more embodiments of the invention.

In one or more of embodiments of the invention, the hypervisor (144) is implemented as computer instructions, e.g., computer code, stored on a persistent storage that when executed by a processor of the production host (130, 140) causes the production host (130, 140) to provide the functionality of the hypervisor (144) described throughout the application and/or all, or a portion thereof, of the methods illustrated in FIG. 2C.

In one or more embodiments of the invention, the hypervisor (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (144) described throughout this application and/or all, or a portion thereof, of the methods illustrated in FIG. 2C.

In one or more embodiments of the invention, the production host (130, 140) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (130, 140) described throughout this application.

In one or more embodiments of the invention, the production host (130, 140) is implemented as a logical device. The logical device may utilize the computing resources of any number of computing devices and thereby provide the functionality of the production host (130, 140) described throughout this application.

In one or more embodiments of the invention, the backup storage system (150) stores backups of the virtual machines (142) and manages the restoration of data from the production hosts using the backups. The backup storage system (150) may include an application manager (152), a template VM (154), and a persistent storage system (156). The backup storage system (150) may include additional, fewer, and/or different components without departing from the invention. Each component of the backup storage system (150) illustrated in FIG. 1 is discussed below.

In one or more embodiments of the invention, the application manager (152) performs a data restoration of data stored in the persistent storage system (156). The application manager (152) may, in response to a request to restore (also referred to as recover) data, may perform the methods of FIGS. 2A and 2B to recover the data. The application manager may, as part of its functionality, generate and install a template VM (154) in the backup storage system (150) that is to be migrated to the production hosts (120) after being populated with the requested data.

In one or more of embodiments of the invention, the application manager (152) is implemented as computer instructions, e.g., computer code, stored on a persistent storage that when executed by a processor of a computing device in the backup storage system (150) causes the computing device to provide the functionality of the application manager (152) described throughout the application and/or all, or a portion thereof, of the methods illustrated in FIGS. 2A-2B.

In one or more embodiments of the invention, the application manager (152) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the application manger (152) described throughout this application and/or all, or a portion thereof, of the methods illustrated in FIGS. 2A-2B.

In one or more embodiments of the invention, the template virtual machine (154) is a virtual machine that is generated by the application manager (152) in the backup storage system (150) and migrated to a production host (130, 140) after being populated with data and/or applications that are to be recovered on the production host (130, 140).

In one or more of embodiments of the invention, the template virtual machine (154) is implemented as computer instructions, e.g., computer code, stored on a persistent storage that when executed by a processor(s) of a computing device cause the computing device to provide the functionality of the template VM (154) described throughout this application.

In one or more embodiments of the invention, the persistent storage system (156) is a system of persistent storage devices that store any number of backups (160A, 160N). In one or more embodiments of the invention, a backup (160A, 160N) is a copy of data associated with a virtual machine. The backup (160A, 160N) may include references to the data that may be used to access the data from the persistent storage system (156). A backup may further include additional data that enables the application manager (152) to restore a virtual machine (or a portion of data associated with the virtual machine) associated with the backup from any production host (130, 140).

In one or more embodiments of the invention, each backup (160A, 160N) is associated with all data and/or applications of a virtual machine (132A, 132N) at a specific point in time. For example, a first backup may include all data and/or applications of a first virtual machine at a point in time T1. A second backup may include all data and/or applications of the first virtual machine at a point in time T2.

In one or more embodiments of the invention, each of the persistent storage system (156) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage described throughout this application.

In one or more embodiments of the invention, each of the persistent storage system (156) is implemented as a logical device. The logical device may utilize the computing resources of any number of computing devices and thereby provide the functionality of the persistent storage system (156) described throughout this application.

FIGS. 2A-2C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2C may be performed in parallel with any other steps shown in FIGS. 2A-2C without departing from the scope of the invention.

FIG. 2A shows a flowchart for performing an application-based recovery in accordance with one or more embodiments of the invention. The method shown in FIG. 2A may be performed by, for example, an application manager (152, FIG. 1). Other components of the system illustrated in FIG. 1 may perform the method of FIG. 2A without departing from the invention.

Turning to FIG. 2A, in step 200, a recovery request is obtained. The recovery request may be obtained from a production host or a client. The recovery request may specify data and/or one or more applications to be recovered. The data and/or application(s) (also referred to as the application data) may be from a virtual machine in the production host at a specified point in time.

In step 202, a backup associated with the recovery request is identified. In one or more embodiments of the invention, the backup is identified using a timestamp (which may include a data and/or data and time) of the recovery request that specifies the point in time associated with the data and/or applications. The backup may include a similar timestamp. The application manager may query the persistent storage system to identify and obtain the backup that has the timestamp that matches the timestamp recovery request or that has a timestamp that is close to the timestamp specified in the recovery request.

In step 204, a determination is made about whether the backup storage system in which the backup is stored is a deduplication-capable storage system. In one or more embodiments of the invention, a deduplication-capable storage system is a storage system in which deduplication operations are performed to each backup so that the amount of data stored in the storage system is reduced. A backup that is deduplicated in the deduplication-capable storage system may include references to data that is not stored as part of the backup due to the data existing as part of another backup. If the backup is stored in a deduplication-capable storage system, the method proceeds to step 206; otherwise, the method proceeds to step 208.

In step 206, a temporary virtual disk that references data associated with the identified backup is generated. In one or more embodiments of the invention, the temporary virtual disk is generated using methods that address the deduplicated state of the backup. For example, if the identified backup is a deduplicated backup, the temporary virtual disk may be generated by copying all of the references to the data associated with the deduplicated backup even if the data is not stored in the deduplicated backup.

In one or more embodiments of the invention, the temporary virtual disk is generated using a fast copy of the identified backup. In one or more embodiments of the invention, a fast copy is process used to generate a copy of a deduplicated backup without the data associated with the backup. The fast copy process may include generating a copy of the references associated with the identified backup and storing the generated copy in a temporary virtual disk that is associated with the identified backup. The temporary virtual disk may be of a logical disk size identical to that of the identified backup, but without the data of the identified backup; rather, at this stage, the temporary virtual disk only includes the aforementioned references to the data.

In step 208, a differencing disk of the identified backup is generated. In one or more embodiments of the invention, a differencing disk is a disk that stores changes to a backup, or other virtual disk, during a period of time. The differencing disk may be a copy of the identified backup. The differencing disk may be a virtual disk of a logical disk size identical to that of the identified backup. The differencing disk may include only the data that has been generated after the differencing disk has been generated. When a differencing disk is first generated, the differencing disk may include only references to data but not the data itself.

In step 210, a template virtual machine is generated using a placeholder disk. The placeholder disk may be the temporary disk generated in step 206 or the differencing disk generated in step 208.

In one or more embodiments of the invention, the template virtual machine is generated by the application manager that utilizes the data of the placeholder disk based on configurations applied to the template virtual machine by the application manager. The configurations may be stored in the placeholder disk.

In step 212, an application-based virtual disk is generated based on the data and/or application(s). The application-based virtual disk may initially be an empty disk that has a logical disk size identical to that of the placeholder disk.

In step 214, a file extent map is generated using a set of file extents associated with the recovery request. In one or more embodiments of the invention, the file extent map is a data structure that specifies the file extents associated with the subset of files to be recovered. A file extent is a data structure that specifies a contiguous portion of a disk in which data associated with a file is stored. The file extent may include an offset and a range associated with the portion of the disk. The file extents of the file extent map may only be associated with the data and/or applications that are to be recovered from the backup.

In one or more embodiments of the invention, the file extent map is generated by identifying the application data that is to be recovered and identifying the references in the placeholder disk that are associated with the application data and generating a data structure that only specifies each of the references. Each reference (also referred to as a file extent) may specify the contiguous portion of a physical disk in the persistent storage system in which a portion of the application data is stored.

In step 216, the application-based virtual disk is populated with application data using the placeholder disk and the file extent map to obtain an updated template virtual machine. In one or more embodiments of the invention, the application-based virtual disk is populated with the application data by generating a copy of data blocks associated with the application data and storing the copy in the application-based virtual disk. The data blocks to be copied are identified using the file extent map. A copy of data blocks not associated with the application data is generated from the placeholder disk. Because the placeholder disk does not include any data, the copy of data blocks may be empty data (i.e., data that does not take up any physical space in a persistent storage device).

In one or more embodiments of the invention, after the application-based virtual disk is populated with the application data, the application-based virtual disk is linked to the template virtual machine, and the template virtual machine is executed using the application-based virtual disk instead of the placeholder disk.

In one or more embodiments of the invention, the application manager populates the application-based virtual disk using the method of FIG. 2B. The application manager may populate the application-based virtual disk via other methods without departing from the invention.

In step 218, the template virtual machine is migrated to the production host. In one or more embodiments of the invention, the template virtual machine is migrated to the production host in which the data was requested. The application manager may communicate with a hypervisor of the production host to initiate a migration by the hypervisor.

FIG. 2B shows a flowchart for populating an application-based virtual disk in accordance with one or more embodiments of the invention. The method shown in FIG. 2B may be performed by, for example, an application manager (152, FIG. 1). Other components of the system illustrated in FIG. 1 may perform the method of FIG. 2B without departing from the invention.

In step 220, a file extent is selected from the placeholder disk. The file extent may be a reference to any of the data stored in the backup.

In step 222, a determination is made about whether the selected file extent is present in the file extent map. If the selected file extent is present in the file extent map, the method proceeds to step 224; otherwise, the method proceeds to step 226.

In step 224, a copy of data blocks associated with the selected file extent is generated using the identified backup. In one or more embodiments of the invention, the copy is generated by identifying the portion of the backup specified by the file extent and reading the data in the identified portion.

In one or more embodiments of the invention, the metadata associated with the file extent is copied as well. In other words, data that provides information about the copy of the data blocks may be stored in the application-based virtual disk as well. The metadata may describe an offset of each block relative to the file associated with the data block. The process of copying the data blocks may include converting the metadata from file offsets (e.g., virtual cluster numbers (VCNs)) to offsets relative to the source volume (e.g., logical cluster numbers (LCNs)). Additional and/or different conversions may be applied to the metadata and/or data blocks without departing from the invention.

In step 226, a copy of data blocks associated with the selected file extent is generated using the placeholder disk. The data blocks may include no information about any files. In other words, the data blocks in the template virtual volume associated with the selected file extent may be little more than disk space that is used to fill the application-based virtual disk to a size similar to that of the identified backup without including all of the data of the identified backup. In one or more embodiments of the invention, the copy is generated by identifying the portion of the placeholder disk specified by the file extent and reading the data in the identified portion.

In step 228, the application-based virtual disk is updated using the copy of data blocks. The copy of data blocks may be the copy of data blocks generated in step 226 (which are empty data blocks) or the copy of data blocks generated in step 224 (which include the application data).

In one or more embodiments of the invention, the copy of data blocks are copied to the application-based virtual disk using an offset, data block size, and/or other metadata specified in the selected file extent. The metadata may also be copied to the application-based virtual disk.

In step 230, the selected file extent is marked as processed.

In step 232, a determination is made about whether all file extents in the placeholder disk have been processed. If all file extents in the placeholder disk have been processed, the method proceeds to step 234; otherwise, the method proceeds to step 220.

In step 234, the placeholder disk is replaced with the application-based virtual disk on the template virtual machine. In one or more embodiments of the invention, the placeholder disk is replaced by deleting the placeholder disk and associating the template virtual machine with the application-based virtual disk. In this manner, the template virtual machine is updated to execute using the application-based virtual disk that now includes all of the application data from FIG. 2A.

FIG. 2C shows a flowchart for installing a template virtual machine in accordance with one or more embodiments of the invention. The method shown in FIG. 2C may be performed by, for example, a hypervisor (134, FIG. 1). Other components of the system illustrated in FIG. 1 may perform the method of FIG. 134 without departing from the invention.

In step 240, a template virtual machine associated with a virtual machine in the production host is obtained. In one or more embodiments of the invention, the template virtual machine is obtained from the application manager that generated the template virtual machine. The template virtual machine may include the application-based virtual disk, which may include data and/or applications that have been recovered from the backup storage system.

In one or more embodiments of the invention, the virtual machine associated with the template virtual machine at one point in time stored the data and/or applications that have been recovered.

In step 242, a determination is made about whether virtual machine associated with the template virtual machine is functional. In one or more embodiments of the invention, the virtual machine may be deemed functional if the data associated with the virtual machine can still be used and/or otherwise accessed by a client. In this case, the client may still want to be able to utilize the virtual machine. If the virtual machine is no longer functional, the virtual machine may no longer need to execute in the production host. If the virtual machine is functional, the method proceeds to step 246; otherwise, the method proceeds to step 244.

In step 244, the virtual machine is deleted. In one or more embodiments of the invention, the virtual machine is deleted to remove any disk space associated with the virtual machine that may no longer be used. In this manner, the template virtual machine may replace the virtual machine after the template virtual machine is installed in step 246.

In step 246, the template virtual machine is installed in the production host. This may include storing the application-based virtual disk in persistent storage of the production host to be accessed by the template virtual machine.

In one or more embodiments of the invention, the template virtual machine is installed by assigning computing resources (e.g. processing and memory) of the production host to be used for the functionality of the template virtual machine. Further, the production host may be configured as necessary to provide the functionality of the template virtual machine of utilizing the applications of the template virtual machine.

Example

Figure 3A:
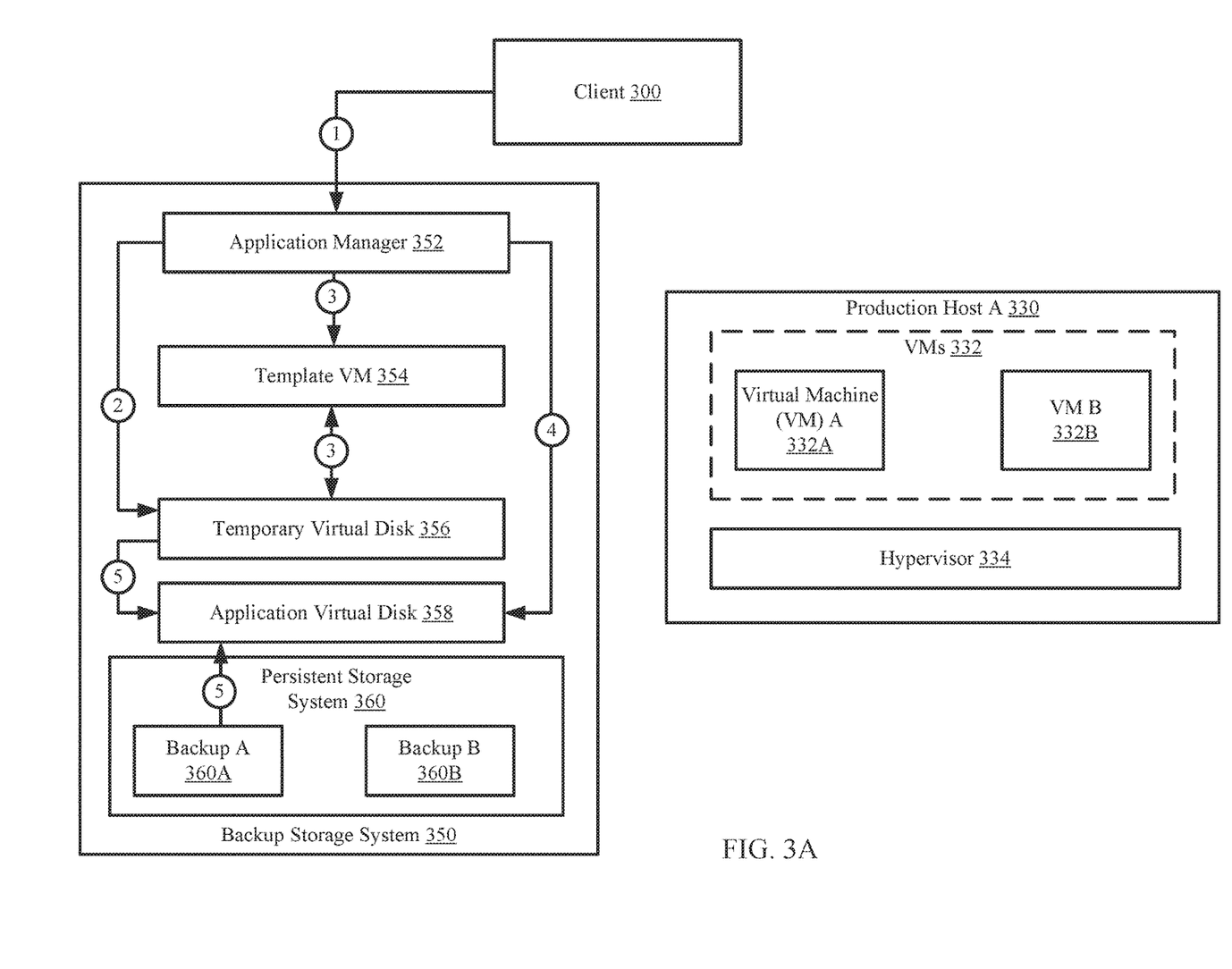
FIGS. 3A-3C show an example in accordance with one or more embodiments of the invention.
Figure 3B:
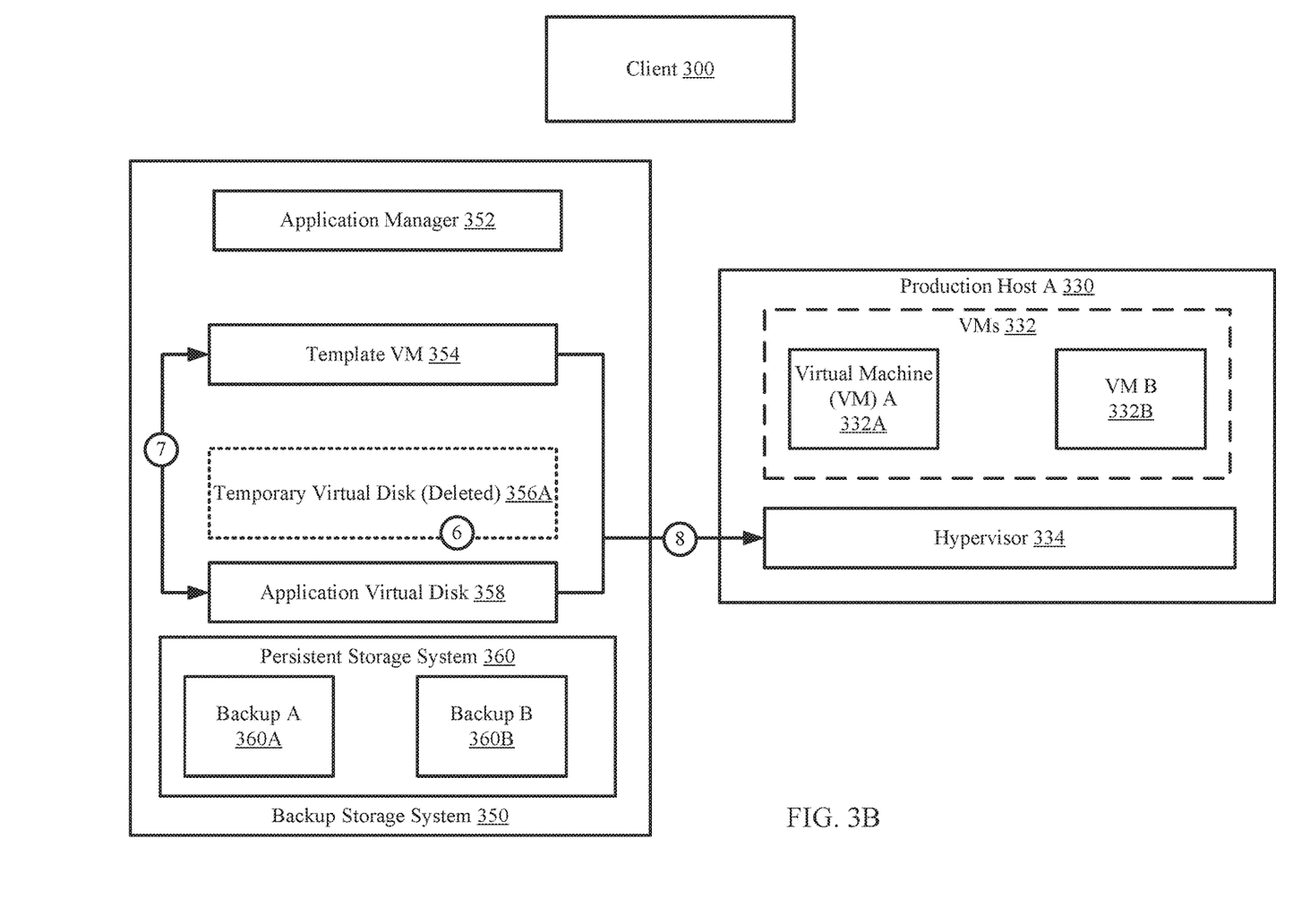

The following section describes an example. The example, illustrated in FIGS. 3A-3B, is not intended to limit the invention. Turning to the example, consider a scenario in which a client requests to recover application data from a virtual machine executing on a production host.

FIG. 3A shows an example system with the client (300) sending a recovery request to an application manager (352) [1] of a backup storage system (350). In this example, the backup storage system is a deduplication-capable storage system. The recovery request specifies the virtual machine associated with the application data that is to be recovered and a point in time associated with the application data; said another way, the recovery request in this example specifies a subset of the total application data that is associated with the virtual machine specified in the recovery request. In this example, the specified virtual machine is virtual machine A (332A) executing on a production host (330).

In response to the recovery request, the application manager (352) identifies a backup associated with the virtual machine at the specified point in time. The application manager identifies backup A (360A) stored in a persistent storage system (360). The application manager (352) further generate a placeholder disk (356) based on backup A (360A) [2]. The placeholder disk (358), also referred to as a temporary virtual disk, is generated by performing a fast copy on backup A (360A). The placeholder disk (356) includes references to data stored in backup A (360A). Each reference may be stored as a file extent. A file extent may further specify an offset and a range in which a contiguous portion of a disk stores data associated with the backup.

The application manger (352) generates a template virtual machine (354) and associates the template virtual machine (354) with the placeholder disk (356) [3]. At this point in time, the template VM (354) is executing using the placeholder disk (356).

The application manager (352) then generates an application-based virtual disk (358) [4]. The application-based virtual disk (358) has a logical disk size similar to that the placeholder disk (356). The application-based virtual disk is then be populated using the placeholder disk (356) and backup A (360A) based on the methods of FIGS. 2A-2B [5]. Specifically, the application manager (352) uses a file extent map to determine whether a file extent of the placeholder disk (356) is associated with the application data. For each file extent specified in the file extent map (i.e., each file extent that is associated with the application data), the data blocks of the file extent are copied from the backup A (360A) and stored in the application-based virtual disk. For the other file extents, the data blocks are copied from the placeholder disk (356). These data blocks (i.e., the data blocks from the temporary disk) are empty data blocks and as such do not require the copying of data and/or take up any physical disk space. In this manner, the application-based virtual disk (358) is of a logical disk size similar to that of the backup (360A) but only uses up the physical disk space necessary to store the application data.

After the application-based virtual disk (358) has been populated, the placeholder disk (356A) is deleted, as shown in FIG. 3B. The deleted placeholder disk (356A) is replaced with the application-based virtual disk (358), such that the template VM (354) is associated with the application-based virtual disk (358) [7].

After the template VM (354) is associated with the application-based virtual disk (358), the template VM (354) is migrated to the production host (330) using a hypervisor (334). The template VM (354) is migrated with the application-based virtual disk (358).

Figure 3C:
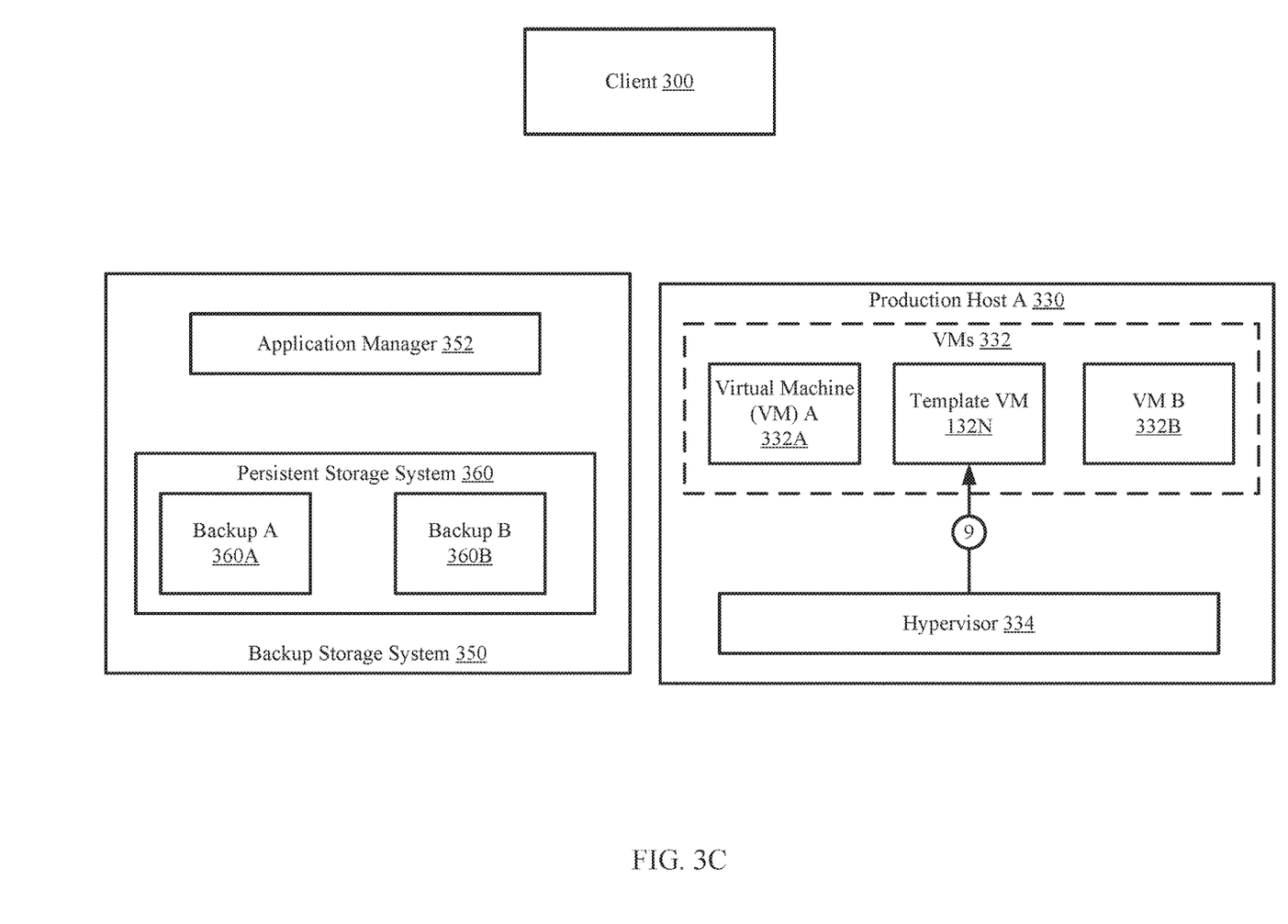

FIG. 3C shows a diagram of the example system with the hypervisor (334) installing the template VM (354) on the production host (330) [9]. The template VM (354) operates using the application-based virtual disk (not shown in FIG. 3C). The hypervisor (354) installs the template virtual machine (354) by allocating a portion of the computing resources (not shown) of the production host to be used by the template VM (354).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of recovering data from a virtual machine. Embodiments of the invention may improve the efficiency of recovering data by performing a method that includes generating a template virtual machine that only stores the requested data to be recovered.

Embodiments of the invention further include installing, via a hypervisor, the virtual machine in the production host that originally hosted the application data. The original virtual machine from which the application data originated may still be operational and thus remain as part of the production host. The template virtual machine housing the recovered application data may also be operational in the production host. In this manner, the data from the original virtual machine is not lost while the application data is also recovered at a virtual machine level while minimizing the amount of data that is stored in the production host.

Thus, embodiments of the invention may address the problem of inefficient use of computing resources and potential performance issues related to recovering a virtual machine using a backup. This problem arises due to the technological nature of the environment in which backup are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for recovering data, the method comprising:
obtaining, by an application manager of a backup storage system, a recovery request for application data stored on a production host;
identifying a backup associated with the recovery request;
generating a placeholder disk associated with the backup, wherein the placeholder disk comprises one of a differencing disk and a temporary virtual disk,
wherein the differencing disk is generated using changes in the backup during a period of time, and
wherein the temporary virtual disk is generated using a plurality of references associated with the backup and not data associated with the backup;
generating a template virtual machine associated with the placeholder disk;
generating an application-based virtual disk based on the placeholder disk;
generating a file extent map based on the recovery request,
wherein the file extent map comprises a plurality of file extents, and wherein the plurality of file extents each comprise an offset and a range associated with a contiguous portion of the backup, and
wherein the application data comprises the portion of the backup;
populating the application-based virtual disk using the backup, the placeholder disk, and the file extent map to obtain a populated application-based virtual disk, wherein populating the application-based virtual disk comprises:
generating a copy of data blocks associated with each of the plurality of file extents;
updating the application-based virtual disk using the copy of the data blocks to obtain the populated application-based virtual disk, wherein the data blocks are obtained from the production host;
replacing the placeholder disk with the populated application-based virtual disk; and
after replacing the placeholder disk with the populated application-based virtual disk, initiating a migration of the template virtual machine,
wherein the production host is operatively connected to the backup storage system.

2. The method of claim 1, wherein initiating the migration of the template virtual machine comprises prompting a hypervisor of the production host to install the template virtual machine in the production host.

3. The method of claim 2, wherein a virtual machine associated with the application data is deleted after initiating the migration of the template virtual machine.

4. The method of claim 1, wherein the backup is stored in a deduplication-capable storage system.

5. A system, comprising:
a production host
a processor; and
memory comprising instructions which, when executed by the processor, perform a method, the method comprising:
obtaining, by an application manager of a backup storage system, a recovery request for application data stored on the production host;
identifying a backup associated with the recovery request;
generating a placeholder disk associated with the backup, wherein the placeholder disk comprises one of a differencing disk and a temporary virtual disk, wherein the differencing disk is generated using changes in the backup during a period of time, and
wherein the temporary virtual disk is generated using a plurality of references associated with the backup and not data associated with the backup;
generating a template virtual machine associated with the placeholder disk;
generating an application-based virtual disk based on the placeholder disk;
generating a file extent map based on the recovery request;
populating the application-based virtual disk using the backup, the placeholder disk, and the file extent map to obtain a populated application-based virtual disk,
wherein the file extent map comprises a plurality of file extents, and wherein the plurality of file extents comprise references to a portion of the backup, and
wherein the application data comprises the portion of the backup,
wherein populating the application-based virtual disk comprises:
generating a copy of data blocks associated with each of the plurality of file extents;
updating the application-based virtual disk using the copy of the data blocks to obtain the populated application-based virtual disk, wherein the data blocks are obtained from the production host;
replacing the placeholder disk with the populated application-based virtual disk; and
after replacing the placeholder disk with the populated application-based virtual disk, initiating a migration of the template virtual machine,
wherein the production host is operatively connected to the backup storage system.

6. The system of claim 5, wherein initiating the migration of the template virtual machine comprises prompting a hypervisor of the production host to install the template virtual machine in the production host.

7. The system of claim 6, wherein a virtual machine associated with the application data is deleted after initiating the migration of the template virtual machine.

8. The system of claim 5, wherein the backup is stored in a deduplication-capable storage system.

9. A non-transitory computer readable medium comprising computer readable program code, which when executed by a computer processor enables the computer processor to perform a method for performing a backup operation, the method comprising:
obtaining, by an application manager of a backup storage system, a recovery request for application data stored on a production host;
identifying a backup associated with the recovery request;
generating a placeholder disk associated with the backup, wherein the placeholder disk comprises one of a differencing disk and a temporary virtual disk,
wherein the differencing disk is generated using changes in the backup during a period of time, and
wherein the temporary virtual disk is generated using a plurality of references associated with the backup and not data associated with the backup;
generating a template virtual machine associated with the placeholder disk;
generating an application-based virtual disk based on the placeholder disk;
generating a file extent map based on the recovery request;
populating the application-based virtual disk using the backup, the placeholder disk, and the file extent map to obtain a populated application-based virtual disk,
wherein the file extent map comprises a plurality of file extents, and wherein the plurality of file extents comprise references to a portion of the backup, and
wherein the application data comprises the portion of the backup,
wherein populating the application-based virtual disk comprises:
generating a copy of data blocks associated with each of the plurality of file extents;
updating the application-based virtual disk using the copy of the data blocks to obtain the populated application-based virtual disk, wherein the data blocks are obtained from the production host;
replacing the placeholder disk with the populated application-based virtual disk; and after replacing the placeholder disk with the populated application-based virtual disk,
initiating a migration of the template virtual machine, wherein the production host is operatively connected to the backup storage system.

10. The non-transitory computer readable medium of claim 9, wherein initiating the migration of the template virtual machine comprises prompting a hypervisor of the production host to install the template virtual machine in the production host.

11. The non-transitory computer readable medium of claim 10, wherein a virtual machine associated with the application data is deleted after initiating the migration of the template virtual machine.

12. The non-transitory computer readable medium of claim 9, wherein the backup is stored in a deduplication-capable storage system, and wherein the placeholder disk is generated by copying a plurality of references from the backup.

* * * * *